United States Patent [19]

Greeninger

[11] 4,176,696
[45] Dec. 4, 1979

[54] FIREPLACE WOOD CUTTING MACHINE

[75] Inventor: Carroll D. Greeninger, Portland, Oreg.

[73] Assignee: Bunyan's Woodcutter Corp., Portland, Oreg.

[21] Appl. No.: 871,160

[22] Filed: Jan. 23, 1978

Related U.S. Application Data

[63] Continuation-in-part of Ser. No. 706,290, Jul. 19, 1976, Pat. No. 4,076,061.

[51] Int. Cl.² .......................... A47J 42/09; B27L 7/00
[52] U.S. Cl. ............................... 144/3 K; 144/193 A; 144/326 R
[58] Field of Search ................... 144/3 K, 192, 193 R, 144/193 A, 323, 326 R; 83/694; 214/85.1, 85.5; 254/104

[56] References Cited

U.S. PATENT DOCUMENTS

| | | | |
|---|---|---|---|
| 1,001,272 | 8/1911 | Howard | 144/193 A |
| 3,862,651 | 1/1975 | Heikkinen | 144/3 K |
| 3,974,867 | 8/1976 | Bufas, Jr. | 144/193 A |

*Primary Examiner*—Travis S. McGehee
*Assistant Examiner*—W. D. Bray
*Attorney, Agent, or Firm*—Chernoff & Vilhauer

[57] ABSTRACT

In a first embodiment of the invention an elongated support frame is provided including inlet and outlet ends. The inlet end includes an inclined loading conveyor and a winch is supported by an upper point of the frame and has a drag cable connected thereto for lengthwise winching logs toward the loading conveyor. Shear structure is supported from the frame adjacent the upper end of the loading conveyor whereby end portions of logs being advanced along the conveyor may be cut therefrom and an elongated trough is provided for receiving cut log end portions. One end of the trough includes stationary wedge structure and a power ram is provided for forcing cut log portions along the trough into engagement with the wedge structure, whereby the cut log portions may be split into multiple log sections. An inclined discharge conveyor is positioned to receive the multiple log sections from the wedge structure and is operative to elevate the logs to an elevated discharge end of the discharge conveyor for gravity discharge therefrom into a suitable receptacle. In a second embodiment of the invention, the wedge structure is displaced laterally of the shear structure and a ramp is provided downstream of the shear structure for displacing the sheared log portion and positioning it for splitting. In this embodiment the wedge structure translates, rather than being fixed, between a retracted position which is upstream of the shear structure and a cutting position which is downstream of the shear structure. When the log portion is positioned for splitting after it has been sheared it is restrained by a backing plate and the wedge structure is forced through it rather than it being forced through a stationary wedge. Therefore, the machine can be made shorter and more compact than in the first embodiment.

23 Claims, 19 Drawing Figures

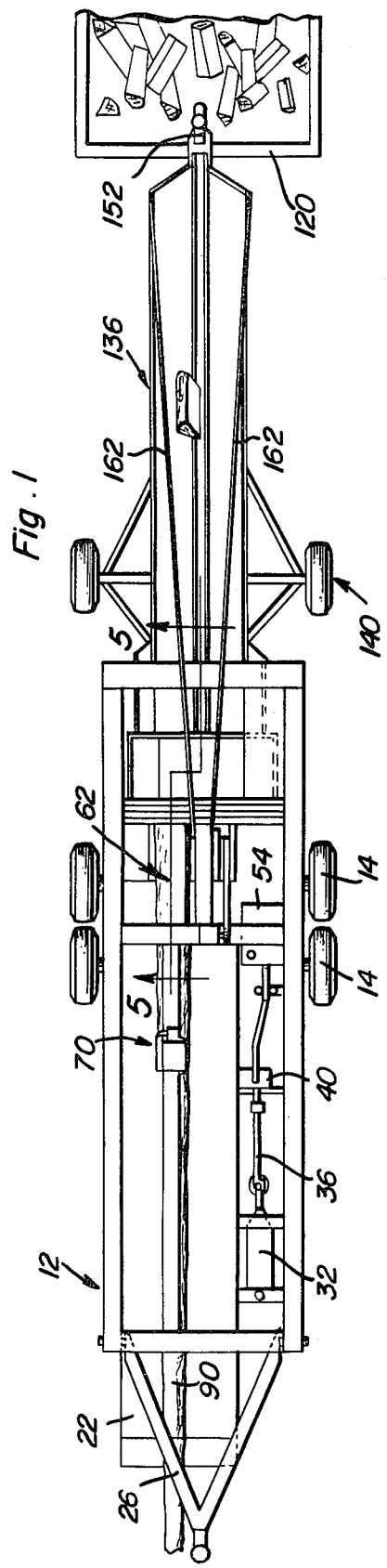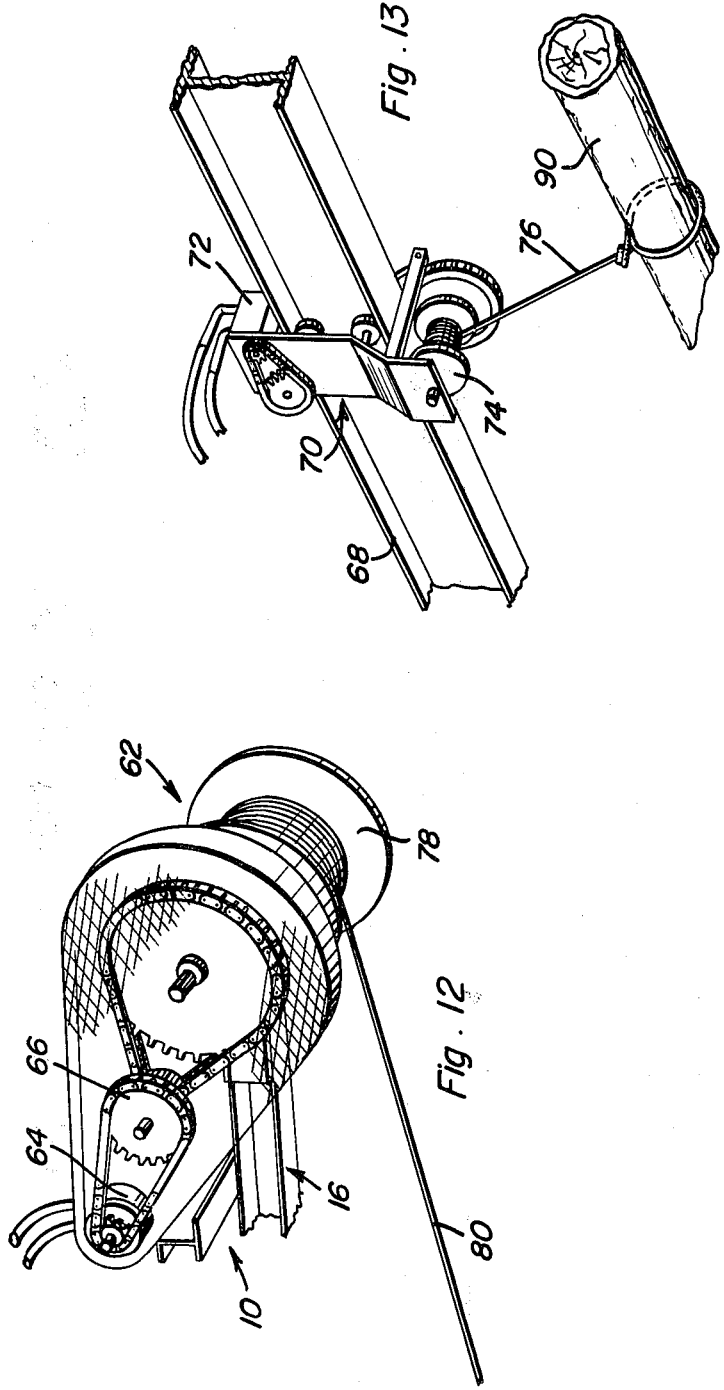

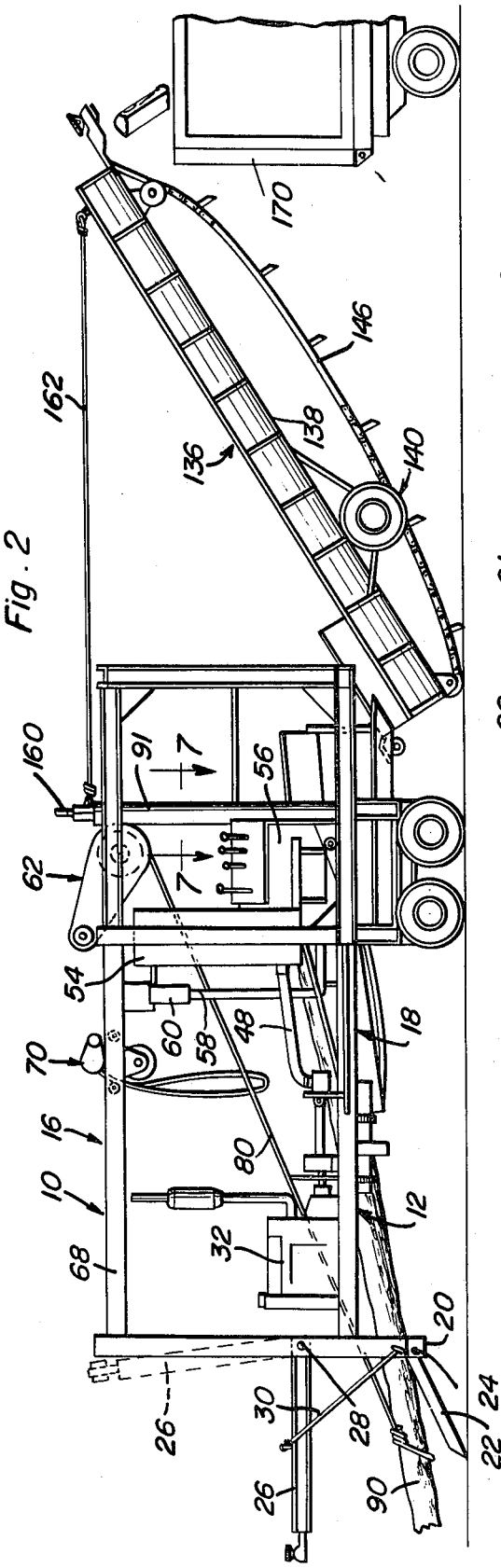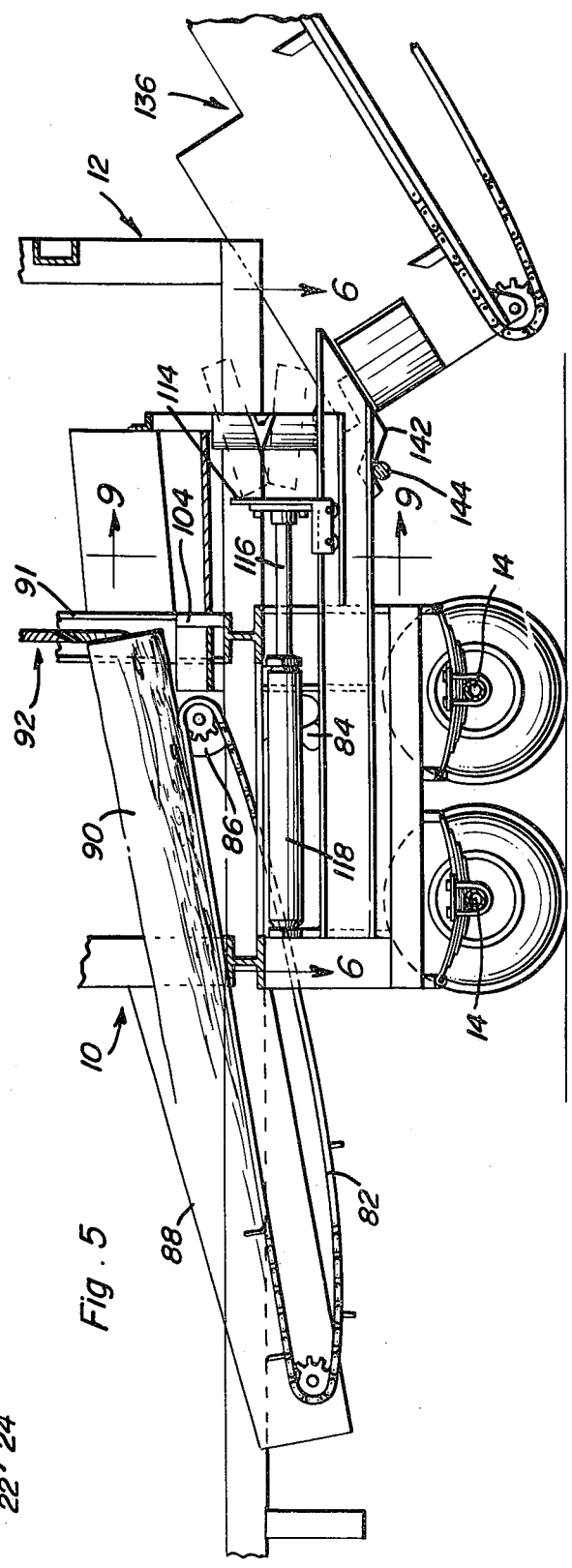

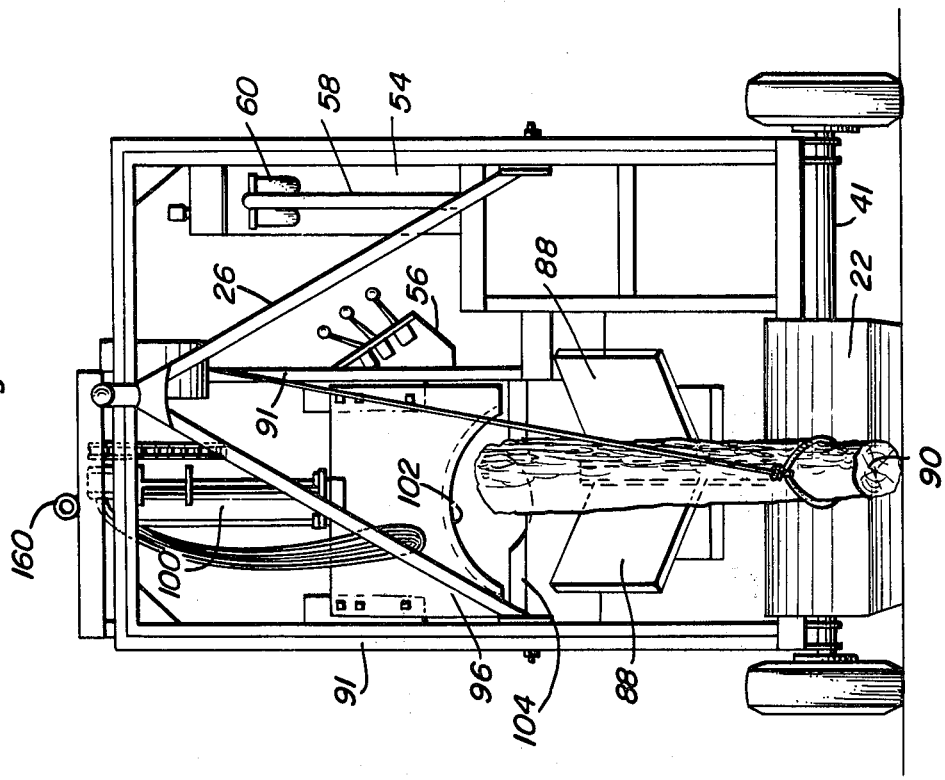
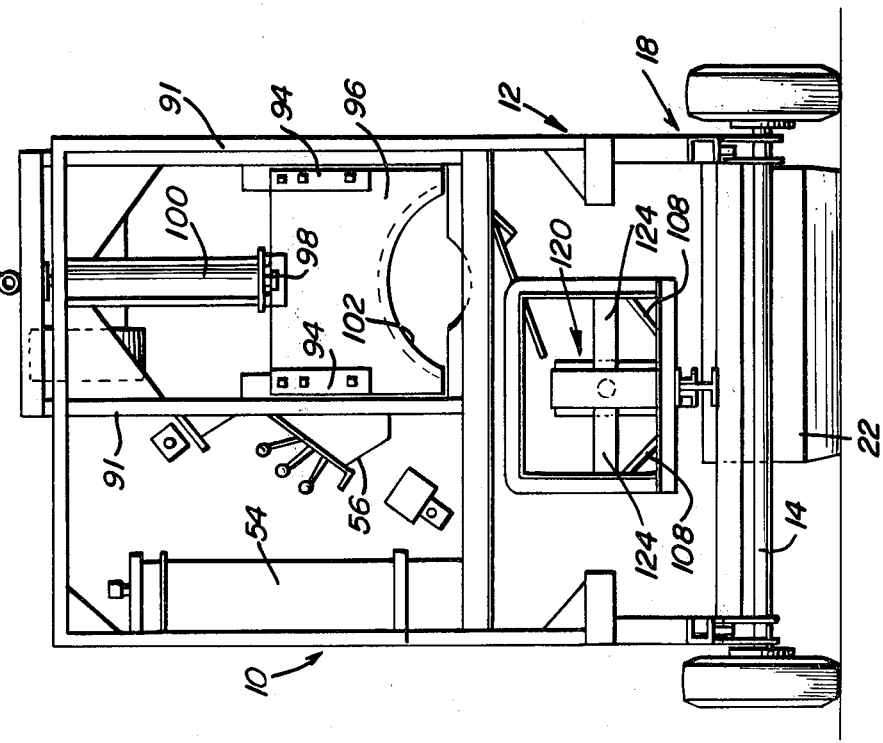

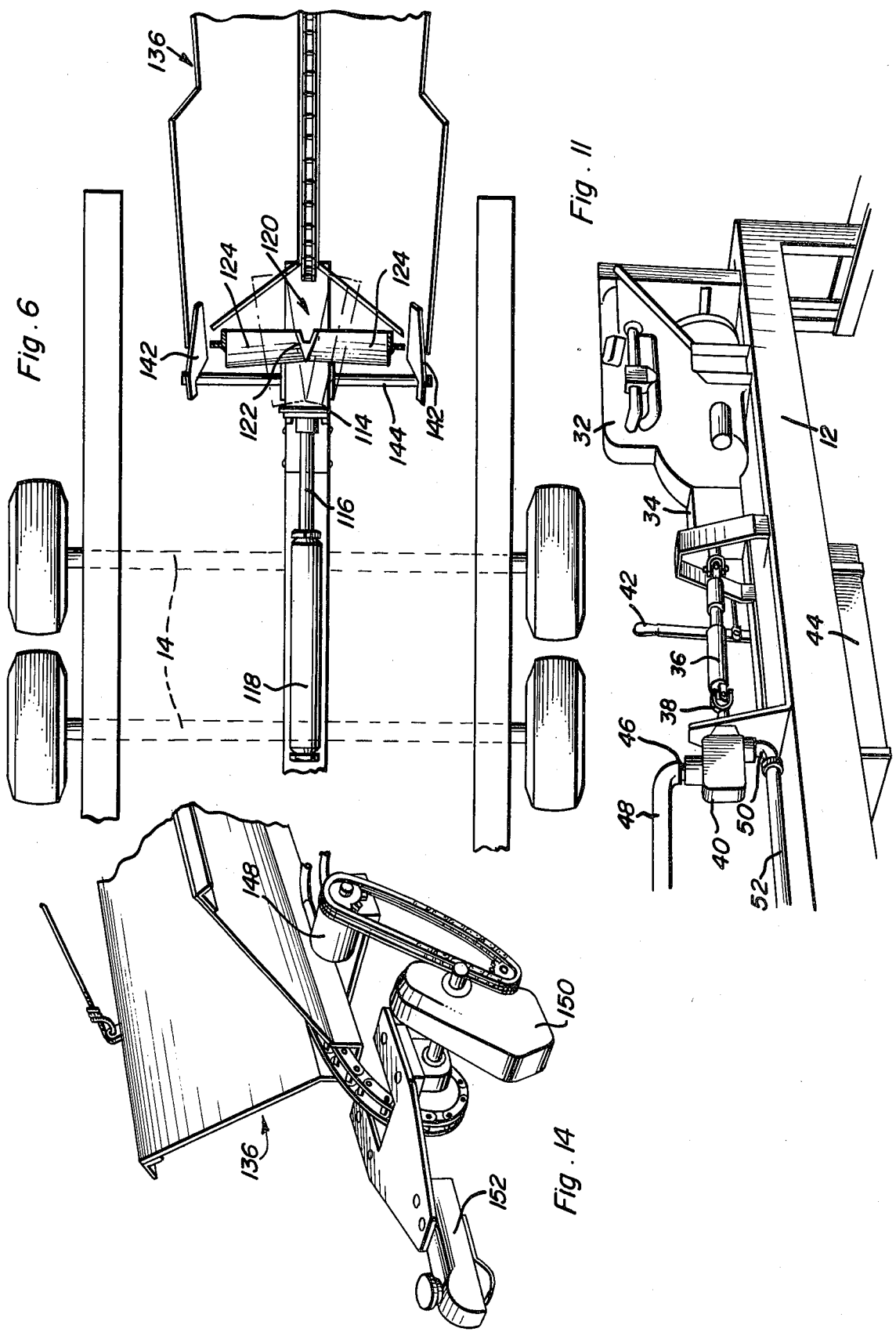

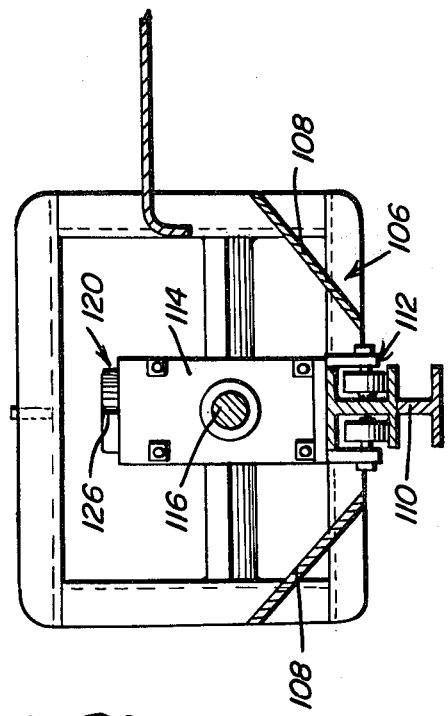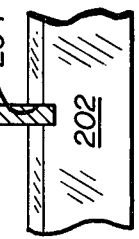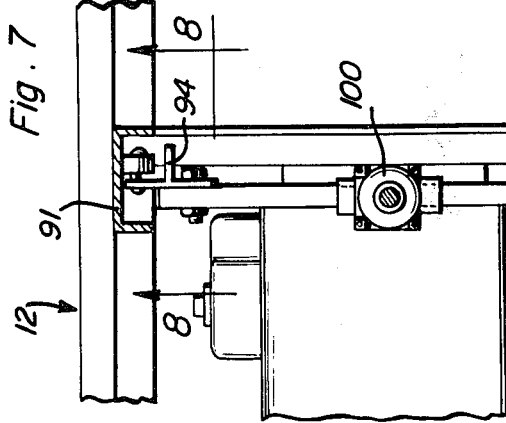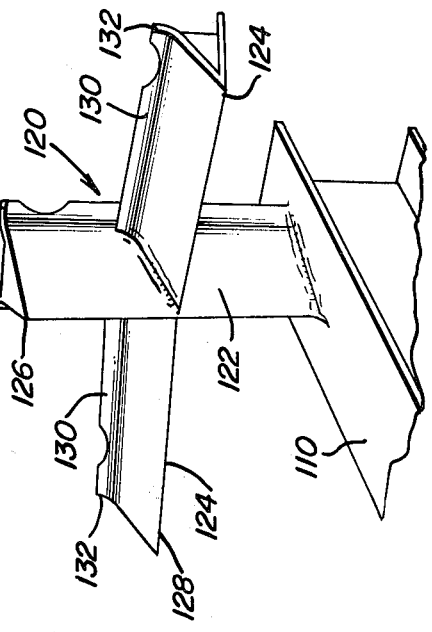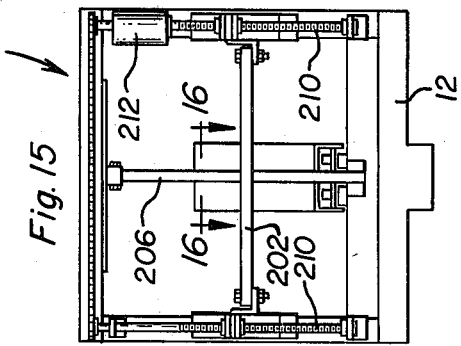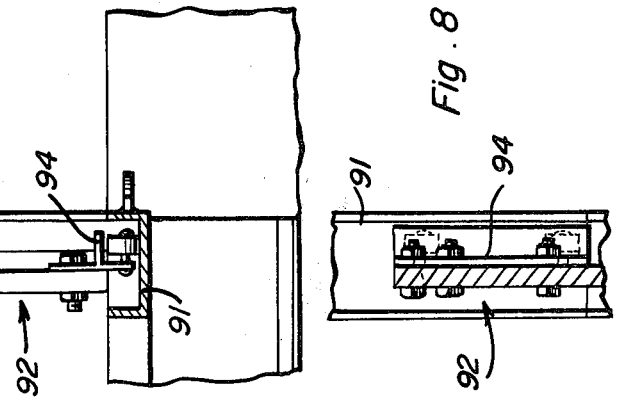

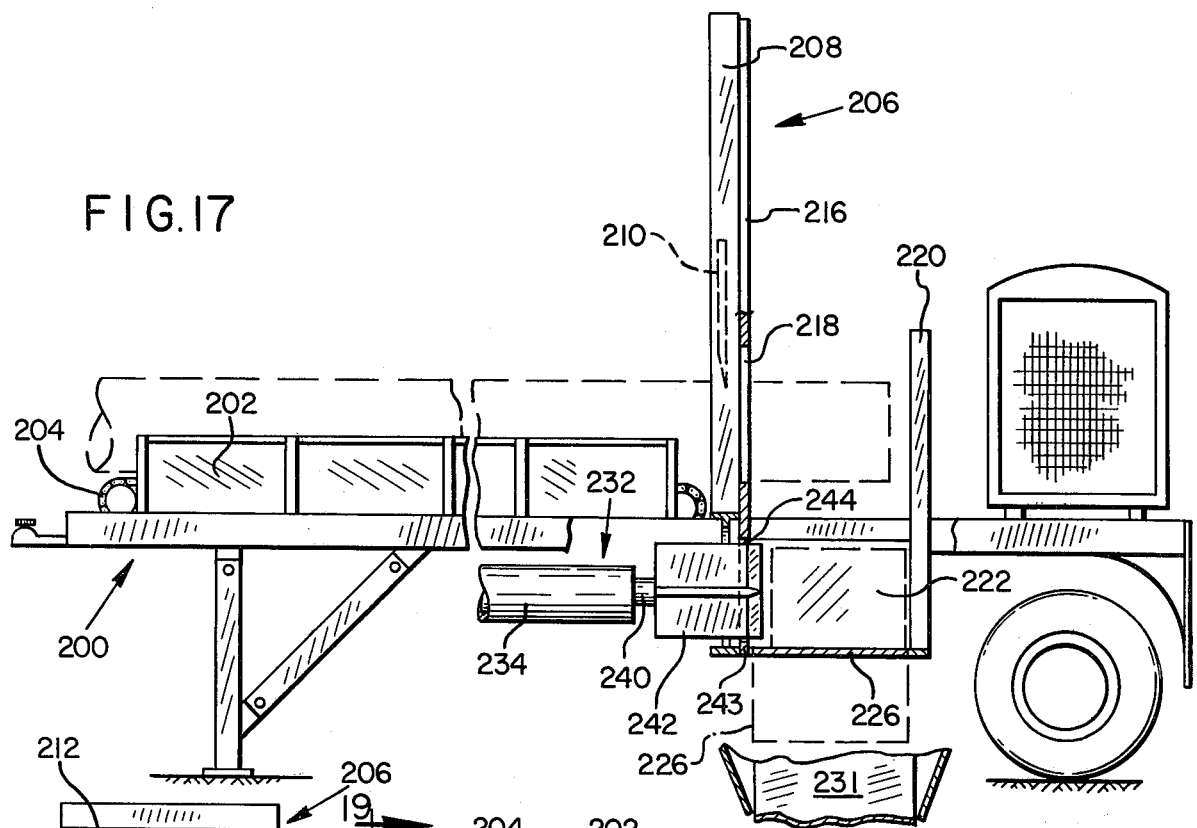

FIREPLACE WOOD CUTTING MACHINE

RELATED APPLICATIONS

This application is a continuation-in-part of application Ser. No. 706,290, filed July 19, 1976 now U.S. Pat. No. 4,076,061.

BACKGROUND OF THE INVENTION

When land is being cleared of trees whose wood is suitable for little more than fire wood, the cut trees are often cut into fire wood at the tree cutting site and shipped to areas where fireplace wood may be marketed. However, there are few machines which are capable of handling relatively long logs and cutting those logs into fireplace wood.

Although various machines have been designed for felling trees by a shearing action and various structures have been provided for cutting short log lengths into log sections of fireplace length and thereafter splitting the short log sections into multiple fireplace log pieces, little attention has been given to the concept of providing an apparatus which may be readily transported to a land clearing site and utilized to efficiently cut full length tree logs into fireplace wood.

Examples of log cutting and splitting devices which have been previously designed are disclosed in U.S. Pat. Nos. 705,659, 1,307,714, 1,441,996, 2,087,321, 2,704,093, 3,242,955, 3,542,100 and 3,862,651.

BRIEF DESCRIPTION OF THE INVENTION

The fireplace wood cutting machine of the instant invention is constructed so as to be as portable in the manner of a trailer and readily rendered operable at a tree cutting site. A first embodiment of the machine includes a winch having a drag cable thereon approximately 500 feet in length for dragging cut tree logs to the machine. The machine includes an inclined loading conveyor whereby logs which have been dragged to the machine may be conveyed up onto the machine and a shear structure is provided for cutting predetermined length end portions from a tree log being advanced upwardly along the loading conveyor. In addition, the machine includes a trough for gravity receiving cut portions of tree logs and one end of the trough is provided with stationary wedge structure against which cut log sections may be forced by means of a hydraulic ram operatively associated with the trough. As the tree log sections are split by the wedge structure, they fall into the lower end of a discharge conveyor upwardly along which they are conveyed to an elevated position for discharge by gravity into a suitable transport.

A second embodiment of the machine has a wedge structure which is displaced laterally of the shear structure in order to greatly reduce the overall length of the machine. A ramp is provided downstream of the shear structure for displacing the sheared log portion and positioning it for splitting. The wedge structure in this embodiment translates between a retractive position which is upstream of the shear structure and a cutting position which causes it to be forced through the sheared log portion which is positioned in the ramp after being sheared and which is restrained from further longitudinal movement by a backing plate. After shearing the piece of wood the shear structure is retracted through a conforming opening in a shear removal plate which again prevents longitudinal translation of the log portion in the opposite direction.

The main object of this invention is to provide a machine which will be capable of cutting full length tree logs into fireplace wood as a result of a single pass of the wood of a tree log through the machine.

Another object of this invention is to provide a machine in accordance with the preceding objects and constructed in the form of a trailer whereby the machine may be readily trailed from one tree cutting operation to another.

A still further object of this invention is to provide a machine in accordance with the preceding objects which will be capable of handling logs of any length and shape.

A further object of this invention is to provide a machine which will be capable of dragging out tree logs toward the machine from distances as great as 500 feet from the machine.

Another very important object of this invention is to provide a machine which will be capable of being operated in an efficient manner by a single operator.

A final object of this invention to be specifically enumerated herein is to provide a machine in accordance with the preceding objects and which will conform to conventional forms of manufacture, be of simple construction and easy to operate so as to provide a device that will be economically feasible, long-lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a top plan view of the fireplace wood cutting machine of the instant invention.

FIG. 2 is a side elevational view of the assemblage illustrated in FIG. 1.

FIG. 3 is an enlarged end elevational view of the discharge end of the machine with the discharge conveyor thereof removed.

FIG. 4 is an enlarged elevational view of the inlet end of the machine.

FIG. 5 is an enlarged fragmentary, longitudinal, vertical sectional view of the machine illustrating the loading conveyor, the shear structure, the log sections splitting structure and the inlet end of the discharge conveyor.

FIG. 6 is a fragmentary, horizontal sectional view taken substantially upon the plane indicated by the section line 6—6 of FIG. 5.

FIG. 7 is an enlarged fragmentary, horizontal, sectional view taken substantially upon the plane indicated by the section line 7—7 of FIG. 1.

FIG. 8 is a fragmentary, vertical, sectional view taken substantially upon the plane indicated by the section line 8—8 of FIG. 7.

FIG. 9 is a fragmentary, transverse, vertical, sectional view taken substantially upon the plane indicated by the section line 9—9 of FIG. 5.

FIG. 10 is a fragmentary, perspective view illustrating the cut tree log splitting wedge structure of the machine.

FIG. 11 is a fragmentary perspective view illustrating the power generating structure of the machine.

FIG. 12 is a fragmentary perspective view illustrating the drag cable winch assembly of the machine.

FIG. 13 is a fragmentary perspective view illustrating the traveling overhead log cradling winch structure of the machine.

FIG. 14 is a fragmentary perspective view of the discharge end of the discharge conveyor.

FIG. 15 is an end elevational view illustrating a modified splitting wedge structure.

FIG. 16 is a fragmentary sectional view taken substantially upon the plane indicated by the section line 16—16 of FIG. 15.

FIG. 17 is a foreshortened side elevational view of another embodiment of the machine.

FIG. 18 is a fragmentary plan view of the machine of FIG. 17.

FIG. 19 is a horizontal sectional view taken substantially upon the plane indicated by the section line 19—19 of FIG. 18.

DETAILED DESCRIPTION OF THE INVENTION

Referring now more specifically to FIGS. 1-16 of the drawings wherein a first embodiment of the invention is illustrated the numeral 10 generally designates the fireplace wood cutting machine of the instant invention. The machine 10 includes a main frame 12 from which underslung tandem axle assemblies 14 are supported and the frame includes upper and lower portions referred to in general by the reference numerals 16 and 18, the axle assemblies 14 being spring supported from the lower section 18.

The frame 12 includes a forward end including a depending portion 20 from which an inclined loading ramp 22 is pivotally supported as at 24 for swinging movement between a downwardly and outwardly inclined operative position and an inoperative upstanding position projecting upwardly from the lower end of the depending portion 20. The frame 12 additionally includes a towing tongue 26 pivotally supported from the forward end of the frame 12 as at 28 and which may be swung downwardly from a substantially upstanding position, such as that illustrated in phantom lines in FIG. 2, to a horizontally and forwardly projecting operative position in which the tongue 26 may be anchored by means of a cable bridle 20.

The lower section 18 of the frame 12 supports a prime mover or engine 32 driving a transmission 34 through a clutch assembly and the transmission 34 drives a drive for driving the winding drum 74 of the winch assembly 70.

The winch assembly 70 has a relatively short cable 76 anchored to its winding drum 74 and the cable 76 may be anchored about a log being advanced to the shear mechanism of the machine 10 for elevating that log in the event the log is curved and may not be otherwise properly fitted into the shear mechanism. The winding drum 78 of the winch assembly 62, on the other hand, has a relatively long cable 80 mounted thereon. The cable 80 may be approximately 500 feet in length and is utilized to drag tree logs toward the machine 10.

The forward end of the machine 10 includes an inclined endless loading conveyor 82 driven by a hydraulic motor 84 through a gear reduction assembly 86 and the conveyor 82 has a pair of trough defining side boards 88 operatively associated therewith. The lower end of the conveyor 82 is positioned to engage a log 90 which has been dragged toward the front end of the machine 10 by means of the cable 80 and upwardly deflected by the loading ramp 22. After the log 90 has been engaged by the conveyor 82 and pulled up onto the latter by means of the cable 80, the conveyor 82 is operative to feed the log 90 upwardly along the conveyor 82.

The frame 12 includes a pair of upstanding opposite side guides 91 from which a vertically reciprocal blade assembly 92 is guidingly supported. The blade assembly 92 includes roller followers 94 rollingly engaged with the guides 91 and the blade assembly 92 includes a vertical blade member 96 from which the foller followers 94 are supported and the lower end of a piston rod assembly 98 of a hydraulic cylinder assembly 100 dependingly supported from the upper section 16 is connected to the upper marginal portion of the vertical blade member 96. The vertical blade member 96 includes a downwardly concave arcuate sharpened edge 102 and the lower portion or section 18 of the frame 12 supports an upwardly arcuate cradle plate 104 with which the blade member 96 is cooperable to shear an end section from the log 90 disposed between the blade 96 and the cradle 104.

As hereinbefore set forth, if the log 90 is crooked it may be necessary to elevate that portion of the log 90 projecting from the front end of the machine 10. The elevation of the log 90 in this manner may be carried out through the utilization of the traveling winch assembly 70 and the cable 76 carried by the winding drum 74 thereof, see FIG. 13.

The rear end of the frame 12 defines a trough assembly referred to in general by the reference numeral 106 including a pair of inclined opposite side panels 108. The lower end of the trough assembly 106 is defined by a structural beam 110 extending longitudinally of the transverse central portion of the rear end of the frame 12 and a guide follower assembly referred to in general by the reference numeral 112 is mounted on the structural beam 110 for movement therealong and supports a heavy gauge pressure plate 114 therefrom. The free end of the piston rod 116 of a horizontally disposed double acting fluid cylinder 118 is anchored to the pressure plate 114 and the cylinder 118 is anchored to the lower section 18 of the main frame 12 beneath the discharge end of the conveyor 82. As cut ends are discharged after being sheared from the log 90 by the blade assembly 92 coacting with the cradle 104, they fall down into the trough assembly 106 to the rear of the forwardly retracted pressure plate 114. Then, the hydraulic cylinder 118 is actuated and the pressure plate 114 rearwardly advanced and engaged with the cut log end disposed in the trough assembly 106 in order to urge the cut log end rearwardly into engagement with a wedge assembly 120 carried by the rear end of the structural beam 110.

The wedge assembly 120 includes an upstanding wedge blade 122 and horizontally outwardly projecting opposite side wedge blades 124 supported from and projecting outwardly from opposite sides of the vertical mid portion of the wedge blade 122.

The wedge blade 122 is V-shaped in horizontal section and positioned with its apex 126 facing forwardly toward the pressure plate 114. The wedge blades 124 are V-shaped in longitudinal vertical section and disposed with their apices 128 also facing toward the pressure plate 114.

The wedge blades 124 define a forwardly opening included angle therebetween of less than 180° and the upper rear marginal edge portions 130 thereof are upwardly flared as at 132. Further, that portion of the wedge blade 122 disposed above the wedge blades 124 include outwardly flared rear marginal edge portions 134.

An alternate embodiment of the wedge assembly 200, FIGS. 15, and 16, includes a one piece horizontal wedge blade 202 which has a medial slot 204 in its leading edge configured for receiving the rear edge of upstanding wedge blade 206. In the embodiment, the horizontal wedge blade is oriented rearwardly of the upstanding wedge blade and is mounted to frame 12 by means of a box frame through a rotating feed screws 210 which in turn are journaled to the box frame at each of its sides. Screws 210 are rotatable by means of a hydraulic motor 212 through appropriate controls (not shown). Accordingly, the horizontal wedge blade can be translated vertically in order to allow center splitting of logs having varying diameters.

A discharge conveyor is provided and referred to in general by the reference numeral 136. The discharge conveyor 135 includes a frame 138 from which a single wheeled transverse axle assembly 140 is supported and the inlet end of the discharge conveyor includes support brackets 142 which are removably engageable over a transverse support shaft 144 carried by the rear end of the lower section 18 of the frame 12, see FIG. 5. The discharge conveyor 135 includes an elongated endless flexible conveyor element 146 driven by a fluid motor 148 drivingly coupled to the endless conveyor element 146 through a reduction gear assembly 150. The reduction gear assembly 150 and motor 148 are carried by the discharge end of the discharge conveyor remote from the brackets 142 and the discharge end of the discharge conveyor 136 includes a trailer hitch assembly 152 by which the discharge conveyor 136 may also be trailed from one location to another in the manner of a trailer.

When it is desired to attach the discharge conveyor 136 to the rear end of the frame 12 of the machine 10, the brackets 142 are engaged over the support shaft 144 and the discharge end of the conveyor 136 is elevated through the utilization of the cable 80 passed through a fair-lead 160 carried by the upper section 16 of the frame 12. After the discharge conveyor 135 has been elevated to the position thereof illustrated in FIG. 2 of the drawings by means of the cable 80 with the conveyor 136 totally supported from the frame 12, an anchor cable 162 is utilized to maintain the conveyor 136 in the operative position thereof illustrated in FIG. 2. Of course, the motor 48 may also be actuated from the console 56. Further, the fluid motors 118, 100, 84, 72, 64 and the hydraulic motor powering the winding drum 74 may all be actuated as desired from the console 56.

In operation, after the machine 10 and discharge conveyor 136 have been trailed to a tree felling location, the tongue 26 is swung to the upstanding phantom-line position thereof illustrated in FIG. 2 and secured in that position. Thereafter, the loading ramp 22 may be lowered to the operative position thereof illustrated in FIG. 2 and the discharge conveyor 136 may be supported from the rear end of the frame 12 in the manner immediately above described. Thereafter, a tree felled to the ground as far as 500 feet distant from the machine 10 may have the cable 80 attached thereto and the winch assembly 62 may be utilized to drag the tree log toward the loading ramp. After the adjacent end of the log 90 engages the loading ramp 22 and is upwardly deflected thereby, the leading end of the log is engaged by and conveyed further upwardly by the conveyor 82.

When the leading end of the log has been positioned past the shear assembly defined by the blade member 96 and the cradle 104, further advancement of the log 90 is terminated for the duration of operation of the shearing mechanism by the hydraulic cylinder 100 being actuated to urge the blade member 96 down onto the log in order to shear the leading end thereof from the remainder of the log. Thereafter, the blade member 96 is again upwardly retracted. As soon as the leading end portion of the log 90 has been cut from the remaining portion thereof, the cut portion falls down into the trough assembly 106 and the hydraulic cylinder 118 is actuated in order to force the cut end portion of the log into engagement with the wedge assembly 120 whereby the latter will split the cut end portion of the log into quarter log segments. These quarter log segments then fall down into the inlet end of the discharge conveyor 136 and are conveyed upwardly therealong by means of the discharge conveyor 136 into a suitable receptacle 170 for transport from the tree felling location to a market place for the fireplace wood. During operation of the hydraulic cylinder 118, the conveyor 82 may again be actuated to advance the log 90 into position to have the next end section cut therefrom through the coaction between the blade member 96 and the cradle 104. As soon as the piston rod 116 of the cylinder 118 has been fully retracted, the hydraulic cylinder 100 may be again actuated in order to shear the next end portion from the log 90 for falling downwardly by gravity into the trough assembly 106 and preparatory to that next log end section being split.

Because the wedge blades 124 define a rearwardly opening included angle of less than 180°, the opposite side portions of the log to be split are first split. Then outwardly flared portions 130 and 134 of the wedge blades 124 and 122 insure that the log portion being split is quickly split into its quarter segments. In addition, that portion of the wedge blade 122 disposed below the wedge blades 124 does not include the outwardly flared portions of the marginal edge portions 134 inasmuch as the provision of such outwardly flared portions on the lower end of the wedge blade 122 would cause binding and require excessive force to effect proper splitting of a log end discharged downwardly into the trough assembly 106.

Referring now to FIGS. 17-19, a second embodiment of the invention includes a frame 200, which is similar to main frame 12 except that it is shorter and more compact. The forward end of the frame includes a v-shaped trough 202 which has an elongate log conveyor 204 which passes through its apex. The log conveyor has a leading edge which is located at the front of frame 200 and a trailing edge which is located medially on the frame.

Immediately downstream of the trailing edge of the log conveyor is a shear structure 206 which comprises an upright mast 208 which slideably carries a shear blade 210 in guides 212. The blade is translatable vertically in the guides by means of piston cylinder 214 which interconnects the blade to the mast. Located downstream of the mast is an anvil plate 216 which has an opening 218 configured to pass the log. Located a spaced distance downstream of anvil plate 216 is a backing plate 220 which is attached to frame 200.

Located between and laterally beside backing plate 220 and anvil plate 218 is a downwardly slopping ramp 222. Ramp 222 is pivotally joined to frame 200 at one end by means of pin 224 and is secured at its other end to a horizontal support door 226 by means of a remotely releaseable latch (not shown). Support door 226 is pivotally joined to frame 200 at a point adjacent to the end of ramp 222 by means of pin 228 and is fixed at its other end by means of a remotely operated latch (not shown) to a side plate 230. Located beneath ramp 222 and support door 226 is a conveyor 231.

Located beside the shear structure is a wedge structure 232 which comprises a hydraulicly operated piston cylinder 234 which is attached to frame 200 through plate 238. Located on ram 240 of cylinder 234 is a cruciform wedge 242. When the piston cylinder is in its retracted position, as shown in the solid lines of FIG. 18, the wedge is located behind the plane of shear blade 210, and when the ram is in its extended position, the dash lines of FIG. 18, it extends above support frame 226 to split a log resting thereon and restrained longitudinal displacement by means of backing plate 220. A wedge removal plate 243 attached to frame 200 in the same plane as anvil plate 216 has an opening 244 passing therethrough which conforms with wedge 242 so that as the wedge is removed from a log portion upon retraction of ram 240 the log portion is prevented from being retracted with it.

In the operation of this embodiment of the invention, the log is moved along log conveyor 204 which is operated by a hydraulic motor (not shown) through appropriate controls until it extends up to backing plate 220 whereupon the conveyor is stopped. Piston cylinder 214 is then extended by application of pressurized hydraulic fluid from a pump (not shown) to displaced blade 210 downwardly where it coacts with anvil plate 218 to sever that portion of the log lying between blade 210 and backing plate 220. The severed log portion then drops onto ramp 222 where it rolls down to be supported on support door 226. In the event the log portion is too small for splitting, the latch associated with ramp 222 can be opened to allow the ramp to drop downwardly and deposit the log segment directly on conveyor 232. A spring closure (not shown) associated with ramp 222 then urges the ramp back to its closed position.

When a log portion is positioned in support door 226 to be split, piston cylinder 234 is extended by application of pressurized hydraulic fluid to extend blade 242 through opening 244 in wedge removal plate 243 to its extended position wherein it splits the log into quarter sections. Piston cylinder 234 is then retracted to withdraw the wedge out of the log segment which is prevented from being transated along therewith by means of wedge removal plate 243. Support door 226 then is opened to the dashed line position of FIG. 19 by releasing its associated catch to drop the split log segments onto conveyor 231. Log conveyor 204 is then reactivated to move the log downstream to expose another section for shearing and the above process is repeated.

The hydraulic circuitry and operational controls of this embodiment are similar to that of the above-described first embodiment and thus have not been shown or described for the sake of simplicity.

I claim:
1. A wood cutting machine comprising:
    (a) an elongate support frame;
    (b) transport means mounted on said frame for conveying logs placed thereon along said support frame;
    (c) shear means, comprising a reciprocal blade having a sharpened edge, mounted on said support frame adjacent to said transport means for cutting log end portions being discharged from the said transport means;
    (d) cradle means located on said support means for cooperating with said blade by supporting said log against the movement of said blade when said blade is cutting said log end portions; and
    (e) splitting means mounted on said frame adjacent to said shear means for splitting said sheared end portions into multiple log sections.

2. The wood cutting machine of claim 1 wherein said transport means comprises an endless conveyor belt, and a hydraulically operated motor arranged to drive said conveyor belt.

3. The wood cutting machine of claim 1 wherein said shear means includes an upwardly facing transfer cradle mounted on said frame for supporting and aligning a log to be sheared and a shearing blade supported from said frame for vertical shifting relative to said cradle, and driving means connected between said frame and said shearing blade operative to selectively vertically shift said shearing blade.

4. The wood cutting machine of claim 1 wherein said frame includes support wheels and a towing tongue for releasable coupling to a towing vehicle.

5. The wood cutting machine of claim 1 wherein said frame has an upper portion including longitudinally extending track support means, a traveling overhead winch assembly mounted thereon for movement therealong, said overhead winch including lift cable means for engagement with and elevating the mid portion of a log supported from said transport means.

6. The wood cutting machine of claim 5 including a drag cable winch carried by the upper portion of said support frame and having a drag cable mounted thereon for winching logs lengthwise toward said conveyor from outwardly thereof.

7. The wood cutting machine of claim 1 wherein the shear means and the splitting means are arranged end-to-end along the longitudinal extent of said frame.

8. The wood cutting machine of claim 7 wherein the splitting means comprises:
    (a) log receiving means supported by said frame for receiving said sheared log end portions from said transport means;
    (b) force means operatively connected to said frame for engaging and forcing said sheared end portions along said log receiving means; and
    (c) stationary wedge means located in said log receiving means, against which said sheared end portions may be forced for splitting.

9. The wood cutting machine of claim 8 wherein said log receiving means comprises an elongated V-shaped trough.

10. The wood cutting machine of claim 8 wherein said wedge means includes a cruciform wedge structure facing toward said log receiving means.

11. The wood cutting machine of claim 10 wherein said cruciform wedge means includes an elongated upright wedge member of generally V-shape in horizontal section with its apex facing toward said log receiving means, and a pair of horizontal elongated wedge members of generally V-shape in vertical section with their apices facing toward said log receiving means, said pair of wedge members being supported from and projecting horizontally outward from opposite side portions of the upright wedge member intermediate its upper and lower ends.

12. The wood cutting machine of claim 11 wherein the marginal edges of the sides of said upright wedge member above said horizontal wedge members and remote from its apex are outwardly flared.

13. The wood cutting machine of claim 12 wherein the marginal edges of the upper sides of said horizontal wedge members remote from said apices are upwardly flared.

14. The wood cutting machine of claim 8 wherein said cruciform wedge means includes an elongated upright wedge member of generally V-shape in horizontal section with its apex facing toward said log receiving means and and elongated horizontal wedge blade of generally V-shape in vertical section with its apex facing toward said log receiving means, said horizontal wedge blade having a central slot arranged to slideably receive said upright wedge blade, and means for supporting said horizontal wedge blade and for moving it vertically with respect to said upright wedge member.

15. The wood cutting machine of claim 8 wherein said force means includes a pressure plate supported from said frame for guided movement along said log receiving means.

16. The wood cutting machine of claim 8 wherein said force means includes a fluid operated piston cylinder connected between said frame and said pressure plate.

17. The wood cutting machine of claim 1 wherein the splitting means is laterally displaced from the shear means.

18. The wood cutting machine of claim 1 wherein the splitting means comprises:
   (a) discharge means located on said frame adjacent to said shear means for discharging said sheared end portions laterally;
   (b) support means located at the extremity of said discharge means for receiving and supporting said sheared log end portions;
   (c) retention means associated with said support means for preventing translation of said sheared end portions longitudinally therein;
   (d) wedge means and force means operatively connected to said wedge means for forcing said wedge means against said end portions for splitting them.

19. The wood cutting machine of claim 18 wherein the force means comprises a fluid operated piston cylinder connected between said frame and said splitting means.

20. The wood cutting machine of claim 18 wherein said wedge means includes a cruciform wedge structure facing towards said log receiving means.

21. A wood cutting machine comprising:
   (a) an elongate support frame having an upper portion including longitudinally extending track support means;
   (b) transport means mounted on said frame for conveying logs placed thereon along said support frame;
   (c) a traveling overhead winch assembly mounted on said track support means for movement therealong, said overhead winch assembly including lift cable means for engagement with and elevating the mid portion of a log supported from said transport means;
   (d) shear means mounted on said support frame adjacent to said transport means for shearing log end portions being discharged from said transport means; and
   (e) splitting means mounted on said frame adjacent to said shear means for splitting said sheared end portions into multiple log sections.

22. The wood cutting machine of claim 21 including a drag cable winch carried by the upper portion of said support frame and having a drag cable mounted thereon for winching logs lengthwise toward said conveyor from outwardly thereof.

23. A wood cutting machine comprising:
   (a) an elongate support frame;
   (b) transport means mounted on said frame for conveying logs placed thereon along said support frame;
   (c) shear means mounted on said support frame adjacent to said transport means for shearing log end portions being discharged from said transport means; and
   (d) splitting means mounted on said frame adjacent to said shear means for splitting said sheared end portions into multiple log sections, said splitting means and said shear means being arranged end-to-end along the longitudinal extent of said frame, wherein said splitting means comprises;
      (1) log receiving means supported by said frame for receiving said sheared log end portions from said transport means,
      (2) force means operatively connected to said frame for engaging and forcing said sheared end portions along said log receiving means, and
      (3) stationary wedge means located in said log receiving means, against which said sheared end portions may be forced for splitting, said wedge means including an elongated upright wedge member of generally V-shaped horizontal section with its apex facing toward said log receiving means and an elongated, horizontal wedge blade of generally V-shaped in vertical section with its apex facing toward said log receiving means, said horizontal wedge blade having a central slot arranged to slideably receive said upright wedge blade, and means for supporting said horizontal wedge blade and for moving it vertically with respect to said upright wedge member.

* * * * *